UNITED STATES PATENT OFFICE.

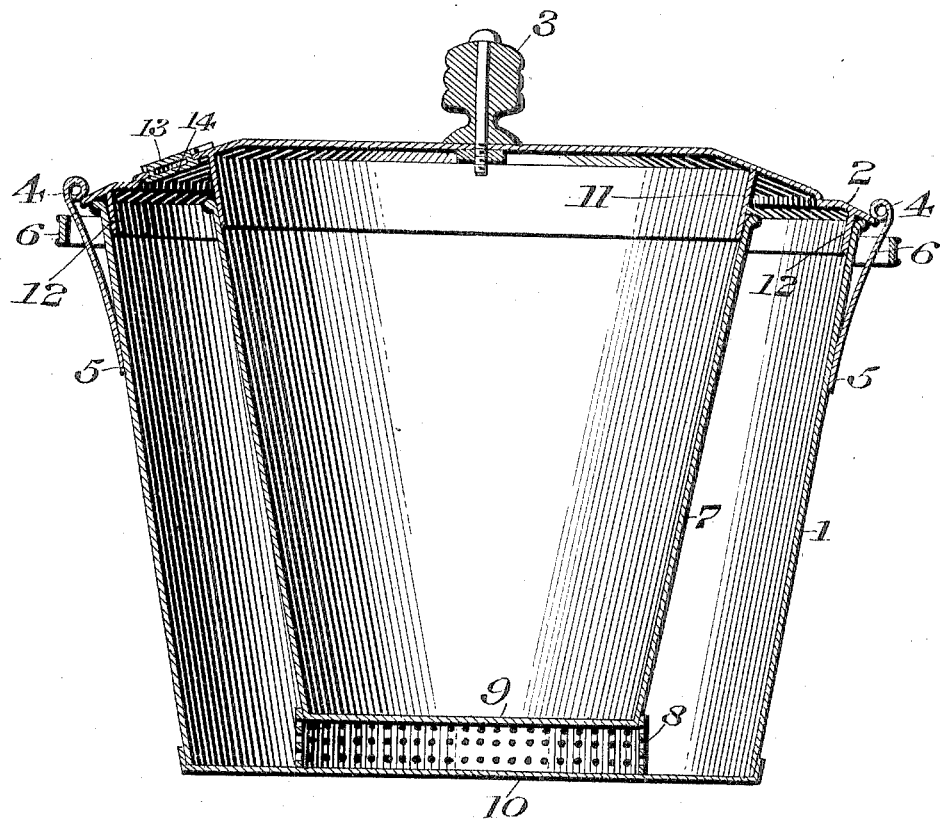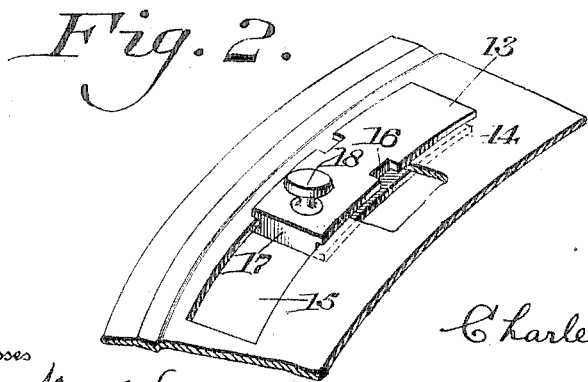

CHARLES H. MARSHALL, OF BROCKWAYVILLE, PENNSYLVANIA.

BREAD-RAISER.

No. 817,499.     Specification of Letters Patent.     Patented April 10, 1906.

Application filed September 2, 1905. Serial No. 276,822.

*To all whom it may concern:*

Be it known that I, CHARLES H. MARSHALL, a citizen of the United States, residing at Brockwayville, county of Jefferson, State of Pennsylvania, have invented a new and useful Bread-Raiser, of which the following is a specification.

In the operation of raising bread as ordinarily carried out it is quite desirable that the bread be maintained at a uniform temperature in excess of that of the surrounding atmosphere. This is difficult of accomplishment with the means ordinarily at hand. I provide a construction of bread or dough raiser to fill this want which is inexpensive, capable of being readily cleaned, requires comparatively little space, and protects the dough from dirt and undesirable moisture while it is being raised.

A further purpose of my invention is to guide the outer and inner pans to their proper relative positions by means upon the lid.

A further purpose of my invention is to provide for keeping the mass of dough being raised at a uniform temperature throughout.

Similar numerals of reference indicate corresponding parts in the figures.

Referring to the drawings, Figure 1 is a vertical section of my bread-raiser through the center thereof. Fig. 2 is a fragmentary perspective of a portion of the lid and closure for an opening therein.

1 designates a pan, can, or other compartment capable of holding hot water or other liquid, which is provided with a lid, cover, or top 2, knotted at 3. The lid is retained in place by snaps, clips, or catches 4 engaging with the edge thereof, said snaps being fastened to the sides of the pan at 5. Handles 6 are located in proximity to the snaps and preferably over the same in order that these handles may guard the snaps from accidental disengagement and may limit movement of said snaps within the range of recovery of the material used.

Within the outer pan I provide a receptacle 7, forming an inner pan, preferably placed centrally thereof and preferably having its sides conforming in general shape to the shape of the outer pan. I have shown the pan and bread-receptacle as both tapered in shape and of circular cross-section—that is, circular truncated cones; but it will be evident that my invention does not depend upon any of these features. Upon the bottom of the receptacle 7 I form a support 8, which I have shown as of screen form and which is attached to the inner pan in order that it may afford a firm support all around the pan with a minimum of material and may not require any placing of support or initial centering of the pan.

Within the top 2 and preferably centrally thereof I form a depending flange 11 of sufficient depth to engage with and form a fairly tight cover for the receptacle 7, which is for this purpose preferably flared at the top thereof, while the flange is correspondingly preferably tapered, as shown. Near the rim of the top or lid and upon the same side thereof as the flange 11 I form a corresponding tapered flange 12, fitting within the preferably-flared top of the outer pan. This combination of tapered flanges upon a common lid is advantageous from the standpoints both of simplicity and utility. The flanges guide the two pans into their concentric or other predetermined relative positions without necessity of care in the initial placing of the parts and provide a close fit of the lid to the inner pan without sticking of the parts, such as occurs in a close fit between cylindrical parts.

I may provide an opening in the lid 2 between the receptacle 7 and the outer pan 1 for admission of water, covering the opening in any desired manner, as by the reversely-bent slide in Fig. 2, whose opposite approximately parallel sides 13 14 embrace the edges of the slot 15 and which after insertion is kept straight therein by the downturned clips or projections 16, which with the part 17 intermediate the sides 13 and 14 act as guides. A knob 18 makes ready movement possible and at the same time unites the sides at this point and keeps them sprung against the lid from opposite sides thereof. An ordinary hinged lid might evidently be used for a closure of this opening.

In assembling my bread-raiser I place the receptacle 7 containing the dough to be raised within the can 1 and fill the space between the pan and receptacle with warm water or other liquid to a height preferably at least equal to the height of the dough in the receptacle. I then place the lid upon the pans, centering them thereby and coincidentally covering them from impurity and preventing the moisture from the hot water from coming in contact with the dough. At intervals, if necessary to maintain the dough within the permissible range of temperature, hot water may be added to the water already within the pan 1. The temperature may also evidently be maintained at any desired point by keeping the pans in a warm room free from cold drafts.

It will be evident that various changes may be made by those skilled in the art which will come within the scope of my invention, and I do not, therefore, desire to be limited in every instance to the exact construction herein shown and described.

Having thus described my invention, what I claim as new, and desire to secure by Letters Patent, is—

1. In a bread-raiser, a plurality of concentric pans and a cover common to said pans having tapered flanges thereon centering and closing all of said pans.

2. In a bread-raiser, a plurality of pans arranged one within another and separated from each other at the bottom and sides, a lid common to all of said pans, clips for said lid secured at one end to the outer pan and handles for the outer pan, restraining excessive movement of the clips.

3. In a bread-raiser, an outer pan, an inner pan, a perforated collar secured to the bottom of the inner pan, a lid for the outer pan and depending tapered flanges from said lid closing the pans.

4. In a bread-raiser, an outer pan, an inner pan, a lid common to said pans, a clip secured to the outer pan for retaining said lid in engagement with said pans, and a handle for the outer pan embracing the clip and restricting its movement.

CHARLES H. MARSHALL.

Witnesses:
JAMES McKAY,
S. C. BOND.